April 1, 1930.  T. JAMESON  1,752,560
ICE CREAM DISHER
Filed Feb. 1, 1926
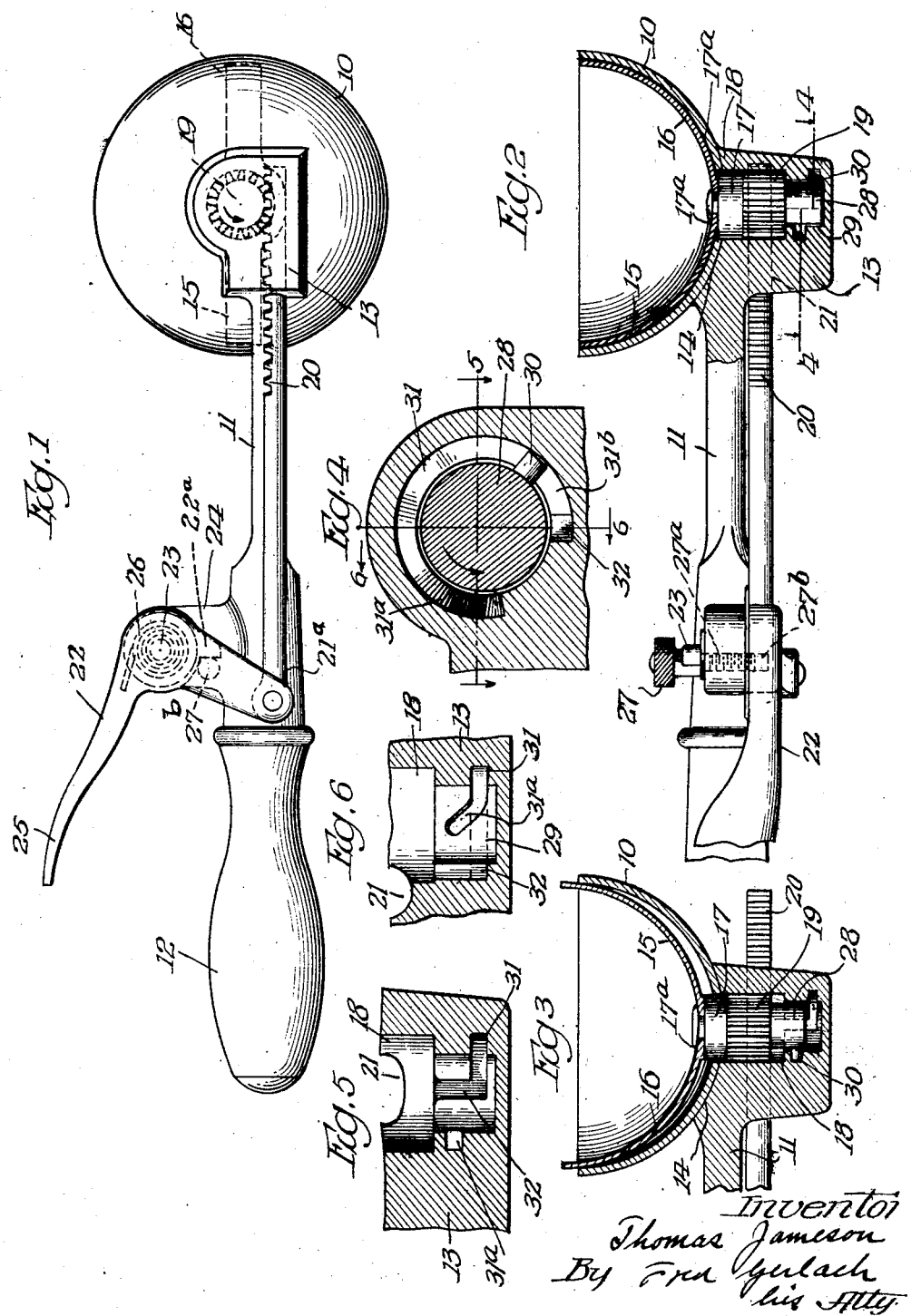

Patented Apr. 1, 1930

1,752,560

UNITED STATES PATENT OFFICE

THOMAS JAMESON, OF NEWARK, NEW JERSEY, ASSIGNOR TO THE GILCHRIST COMPANY, OF NEWARK, NEW JERSEY, A CORPORATION OF NEW JERSEY

ICE-CREAM DISHER

Application filed February 1, 1926. Serial No. 85,154.

The invention relates to ice-cream dishers.

The object of the invention is to provide a disher of the type in which the scraper rotates in the bowl, with improved means for shifting the scraper axially away from the wall of the bowl so as to insure the separation of the ice-cream therefrom.

A further object of the invention is to provide means for positively retracting the scraper after it has been shifted axially away from the bowl.

The invention consists in the several novel features hereinafter set forth and more particularly defined by the claims at the conclusion hereof.

In the drawing: Fig. 1 is an inverted plan of an ice-cream disher embodying the invention. Fig. 2 is a side elevation of the disher, parts being shown in section. Fig. 3 is a detail section showing the means for shifting the scraper axially in its operative position. Fig. 4 is an enlarged section taken on line 4—4 of Fig. 2. Figs. 5 and 6 are detail sections taken on lines 5—5 and 6—6 respectively of Fig. 4, showing both sides of the socket in which the shoulder on the inner end of the scraper shaft is mounted, and the cam groove which is adapted to cooperate with the pin on the shoulder to positively shift the scraper axially in both directions.

The invention is exemplified in an ice-cream disher comprising a bowl 10 of any suitable form or shape, and a handle-shank 11 provided at one end with a handle 12 and at its other end with an integral enlarged member 13 which is provided therein with a seat 14 corresponding in form to the central portion of the bowl 10 and in which the latter is rigidly secured. A scraper for separating the ice-cream from the bowl is disposed within the latter and comprises a pair of arms or blades 15 and 16 which extend in opposite directions and conform to the inner surface of the bowl. The central portion of the scraper is enlarged and fits across the bottom or apex of the bowl and has a shaft 17 riveted thereto as at 17ª. Shaft 17 extends rearwardly and is disposed in an annular chamber 18 formed in the member 13 of shank-handle 11. The central portion of shaft 17 is enlarged and is cut to form a pinion 19 which is adapted to mesh with and be rotated by a rack 20 which is slidably mounted in an opening 21 which extends longitudinally through member 13, is offset relatively to the axis of bowl 10 and intersects chamber 18 at one side thereof. Rack 20 extends beneath handle-shank 11 and is pivotally connected at its distal end to a stud 21ª which is carried by one end of an angular horizontally disposed finger-lever 22. This lever is pivoted on a stud 23 which is mounted on a laterally offset lug 24 which is integrally formed with handle-shank 11. Lever 22 is provided with an outwardly extending finger-piece 25 whereby it may be manually actuated to shift rack 20 to rotate pinion 19 and operate the scraper in the bowl. A coil spring 26 is disposed in suitable pockets formed in the contiguous faces of the lever and lug respectively and the pressure thereof is applied to retract the lever and parts operated thereby, including the scraper. A thumb screw 27 extends through lug 24 and is connected thereto by a screw-thread connection 27ª. This screw is provided at its inner end with a pin 27ᵇ which, when the screw is in its operative position, as shown by Fig. 2, extends within the path of movement of and is adapted to be engaged by a lug 22ª which is integrally formed with finger-lever 22 and cooperates with pin 27ᵇ to limit the movement of the lever in its retracted direction.

The new and improved means for shifting the scraper axially to insure the separation of ice-cream from the bowl, comprises a shoulder 28 formed at the rear end of shaft 17 and mounted in a socket 29 formed in member 13; a pin 30 secured to the inner end of shoulder 28 and projecting laterally therefrom; and a groove 31 which is formed in member 13 adjacent the inner end of socket 29 and in which the pin 30 extends. Groove 31 extends circumferentially around socket 29 and is provided at one end with a cam surface 31ª which extends upwardly and toward the scraper and which is adapted to shift pin 30 when it is swung into engagement therewith to move the scraper axially away from the bowl. When the scraper shaft 17 is rotated in the opposite direction, the pin will be forced by the cam surface 31ª back to groove 31, thereby positively shifting the scraper back into its normal position. Cam surface 31ª is formed on groove 31 approximately 180° or more from the point adjacent which pin 30 is positioned when the scraper operating elements are in their inoperative or retracted position (Fig. 4), so that scraper blades 15 and 16 are permitted to traverse the entire inner surface of the bowl before they are shifted axially. The other end of slot 31 is extended in the opposite direction as at 31ᵇ a sufficient distance to permit the rack, after screw 27 has been withdrawn, to be shifted out of engagement with pinion 19. A slot 32 is formed in member 13 adjacent socket 29 and extends substantially parallel to the axis of bowl 10 and shaft 17. The rear end of this slot intersects the extension 31ᵇ of groove 31, and the front end opens into chamber 17. By means of this slot, the pin 31 may be inserted into or withdrawn from groove 31.

The operation of the disher will be as follows: When bowl 10 has been filled with ice-cream, the finger-lever 22 will be shifted toward handle 12, thereby operating rack 20 to rotate pinion 19 and shaft 17. During the rotation of shaft 17, pin 30 will slide in groove 31 until it engages the cam surface 31ª, whereupon it will be thrust upwardly and will shift shaft 17 and the scraper axially, thereby insuring the separation of the ice-cream from the inner wall of the bowl. When the finger-lever 22 is released, the force of spring 26 will be applied to retract rack 20, thereby rotating pinion 19 in the opposite direction. During this rotation, pin 30 will be forced rearwardly by the cam surface 31ª back into groove 31, thereby causing the scraper to be positively shifted into its normal position. Should it be desired to remove the scraper from the bowl for cleaning or repairing purposes, screw 27 will be withdrawn to permit finger-lever 22 to be shifted outwardly so that rack 20 may be disengaged from pinion 19. During the latter operation, shaft 17 will be reversely rotated and pin 30 will travel in the portion 31ᵇ of groove 31 until it is opposite slot 32. The pin in this position will then be removable through slot 32 to permit the scraper and its shaft to be withdrawn. To replace the scraper into the bowl after it has been removed therefrom, the operation will be the same, except in reverse order.

The invention exemplifies an ice-cream disher which is provided with new and improved means for shifting the scraper axially away from the bowl, and also means for positively retracting the scraper after it has been so shifted.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an ice-cream disher, the combination of a bowl, a handle for the bowl, a scraper mounted to rotate in the bowl, means for rotating the scraper in the bowl comprising a finger lever adjacent the handle, means for shifting the scraper axially away from the bowl during rotation thereof in one direction, and means for positively returning the scraper to the bowl during rotation thereof in the opposite direction.

2. In an ice-cream disher, the combination of a bowl, a handle for the bowl, a scraper mounted to rotate in the bowl, means to rotate the scraper in the bowl comprising a finger lever adjacent the handle, means to shift the scraper axially away from the bowl, and cam means to shift the scraper axially in the opposite direction to retract it.

3. In an ice-cream disher, the combination of a bowl, a handle for the bowl, a scraper mounted to rotate in the bowl, means to rotate the scraper in the bowl, means to shift the scraper axially away from the bowl, and means comprising a pin and a cam groove to shift the scraper axially in the opposite direction to retract it.

4. In an ice-cream disher, the combination of a bowl, a handle for the bowl, a scraper mounted to rotate in the bowl, means for rotating the scraper in the bowl comprising a finger lever adjacent the handle, and means for positively shifting the scraper to and from the bowl during rotation of the scraper.

5. In an ice-cream disher, the combination of a bowl, a handle for the bowl, a scraper mounted to rotate in the bowl, means to rotate the scraper in the bowl comprising a finger lever adjacent the handle, and cam means to shift the scraper positively to and from the bowl.

6. In an ice-cream disher, the combination of a bowl, a scraper mounted to rotate in the bowl, means to rotate the scraper in the bowl, and means comprising a pin and a cam groove, to shift the scraper positively to and from the bowl.

7. In an ice-cream disher, the combination of a member provided with a bowl, a scraper mounted to rotate in the bowl, a shaft member for the scraper extending through the apex of the bowl and into said member, means to rotate the shaft member, one of said members being provided with a cam groove, and a pin mounted on the other member and extending into the groove to shift positively the shaft member axially in opposite directions.

8. In an ice-cream disher, the combination of a member provided with a bowl, a scraper mounted to rotate in the bowl, a shaft for the scraper extending through the apex of the bowl and into the member, means to rotate the shaft, said member being provided with a cam groove, and a pin mounted on the shaft and extending into said groove to shift positively the shaft axially in opposite directions.

9. In an ice-cream disher, the combination of a bowl, a handle for the bowl, a scraper mounted to rotate in the bowl, means to rotate the scraper in the bowl, means to shift positively the scraper axially to and from the bowl, and a lever adjacent the handle, said rotating and shifting means being connected to said lever and conjointly operated thereby.

Signed at Newark, New Jersey, this 27th day of January, 1926.

THOMAS JAMESON.